(12) United States Patent
Hegemier et al.

(10) Patent No.: US 6,289,042 B1
(45) Date of Patent: Sep. 11, 2001

(54) MEDIA INDEPENDENT MODULAR COMMUNICATION REPEATER SYSTEM

(75) Inventors: Jeffrey W. Hegemier; Michael A. Bush, both of Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/025,004

(22) Filed: Feb. 17, 1998

(51) Int. Cl.[7] ....................................... H04B 3/36
(52) U.S. Cl. ............................................... 375/211
(58) Field of Search ................... 375/211, 219; 455/7; 370/279, 293, 492; 178/71.9

(56) References Cited

U.S. PATENT DOCUMENTS

| | | | |
|---|---|---|---|
| 5,299,195 | * 3/1994 | Shah | 370/462 |
| 5,414,708 | * 5/1995 | Webber et al. | 370/445 |
| 5,592,475 | * 1/1997 | Gliga et al. | 370/359 |
| 5,648,959 | * 7/1997 | Ilyadis et al. | 370/445 |
| 5,692,043 | * 11/1997 | Gliga et al. | 379/399 |

* cited by examiner

Primary Examiner—Tesfaldet Bocure
(74) Attorney, Agent, or Firm—Himanshu S. Amin; Alexander M. Gerasimow; William R. Walbrun (57) ABSTRACT

A modular communication repeater system is provided. The system includes at least one communication repeater adapter device coupled with a plurality of repeater communication modules. A single repeater adapter connector is provided on one side of the repeater adapter. Each of the plurality of repeater communication modules is provided with an input connector on one side and an output connector on the other side. The repeater adapter device includes an internal communication repeater circuit adapted to receive communication data on a one of first and second sets of repeater adapter contacts and broadcast the communication data onto the other one of the first and second sets of repeater adapter contacts. Each of the repeater communication modules includes a cascading backplane interconnecting the first sets of electrical contacts in an input connector to the second sets of electrical contacts in an output connector.

11 Claims, 8 Drawing Sheets

MEDIA INDEPENDENT MODULAR COMMUNICATION REPEATER SYSTEM

BACKGROUND OF THE INVENTION

The present invention is directed toward the art of communication systems and, more particularly, to industrial communication and control systems of the type including multiple data and command producer devices connected via diverse media types to multiple data and command consumer devices and will be described with particular reference thereto. However, it is to be appreciated that the present invention finds application in any network system where command, data, or other information is exchanged between a plurality of nodes over a variety of media types.

There are many prior art communication systems that rely on a bus type hardware topology to support fast information transfer between multiple communication modules and repeater devices within an industrial application. Systems of this type are commonly referred to as multi-drop communication systems. Although such multi-drop communication systems using bus type topologies are well suited for efficient communication and data transfer, expanding those systems, once installed, to include additional devices is difficult. In that regard, one problem associated with traditional multi-drop communication networks is that they are expandable only at the outer two ends of the bus. This being the case, it is often impossible to freely add communication devices at locations in the network where they may be most needed, without re-configuring the entire network anew.

Therefore, it is desirable to provide an improved industrial control network, preferably a modular communication repeater system, of the type which makes it easy to exchange, add, and subtract communication modules anywhere within the system as needed without dismantling the network and reconfiguring the system anew.

It is also desirable to provide a communication system that supports not only all standard network topologies such as, for example, bus, star, and ring topologies but one that supports all forms of custom or specialized topologies as well. It would further be desirable to be able to expand the communication network to use additional communication devices as needed and where needed regardless of the network topology.

It is also desirable to provide an industrial modular repeater system of the type that supports multiple media types using multiple technologies such as copper based, fiber based, and broadcast type media, hardware, and methods. A preferred repeater system would be adaptable for use with twisted pair, co-axial cable, IR, RF, glass, plastic, and other media types within a single communication system.

SUMMARY OF THE INVENTION

The subject invention provides an improved communication repeater system adapted for use in an industrial control system to repeat communication activity detected on one communication port onto multiple communication ports in the industrial control system. Each communication port is interfaced to a media type that is based on the requirements of the target application. In that way, communication activity detected on one communication media is repeated onto multiple communication media of one or more different types in the industrial control system. The media type is transparent to the repeater system.

The modular communication repeater of the invention includes at least one communication repeater adapter device and a plurality of repeater communication modules connected together in a stacked side-by-side arrangement interengaged with the repeater adapter. A single repeater adapter connector is provided on one side of the repeater adapter. The repeater adapter connector has a first set of repeater adapter contacts at a first position on the connector and a second set of repeater adapter contacts at a second position on the connector. In addition, the repeater adapter device includes an internal communication repeater circuit that operates to receive communication data on a one of the first and second sets of repeater adapter contacts and then immediately re-broadcast the communication data onto the other one of the first and second sets of repeater adapter contacts. The communication activity is re-broadcast substantially simultaneously as it is received.

Each of the plurality of stacked first repeater communication modules includes a set of input and output connectors and a communication circuit for transmitting and receiving communication data on at least one communication port in the industrial control system. The communication ports in the modules support all of the above-identified media types, as needed, based on the media type needs of the application. The output connectors on the communication modules are substantially identical in construction to the repeater adapter output connector. The input connectors on the communication modules are each intermatable with the repeater adapter output connector and, further, are intermatable with the output connectors on each of the other communication modules.

The input connectors on the communication modules have a first set of electrical contacts connected to the first set of repeater adapter output contacts, and a second set of electrical contacts connected to the second set of repeater adapter output contacts. The first output connector on the communication modules includes a first set of electrical contacts arranged on the first output connector at a first position substantially corresponding to the first position of the first set of repeater adapter output contacts on the repeater adapter connector, and a second set of electrical contacts arranged on the first output connector at a second position substantially corresponding to the second position of the second set of repeater adapter output contacts on the repeater adapter connector.

Lastly, each of the plurality of first repeater communication modules includes a first backplane interconnecting the first set of electrical contacts in the first input connector to the first communication circuit in the module. The first backplane also interconnects the second set of electrical contacts in the first input connector to the first set of electrical contacts in the first output connector.

As can be seen from the foregoing, the primary object of the present invention is to provide an improved industrial modular repeater communication system that is easily expandable and adapted to transmit and receive communication data and commands on multiple physical media types within a single network. The architecture of the subject modular repeater communication system is media independent.

It is an advantage of the present invention that the plurality of communication modules connected to a single repeater adapter are adapted to function independently of their respective intermated positions adjacent the repeater adapter unit. Each communication module includes a swizzled backplane connected on either end to a module connector. When the modules are interconnected, the backplane provides for communication of data and commands between the module connectors to the set of intermated modules without the requirement of port or destination identification tags, specialized hardware jumpers, or the like.

It is yet another advantage of the present invention that the plurality of communication modules are adapted to provide a hardware layer interface that is easily adaptable for use with a wide variety of media types including copper based, fiber based, and broadcast type media technologies such as radio frequency or infra-red, as examples.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
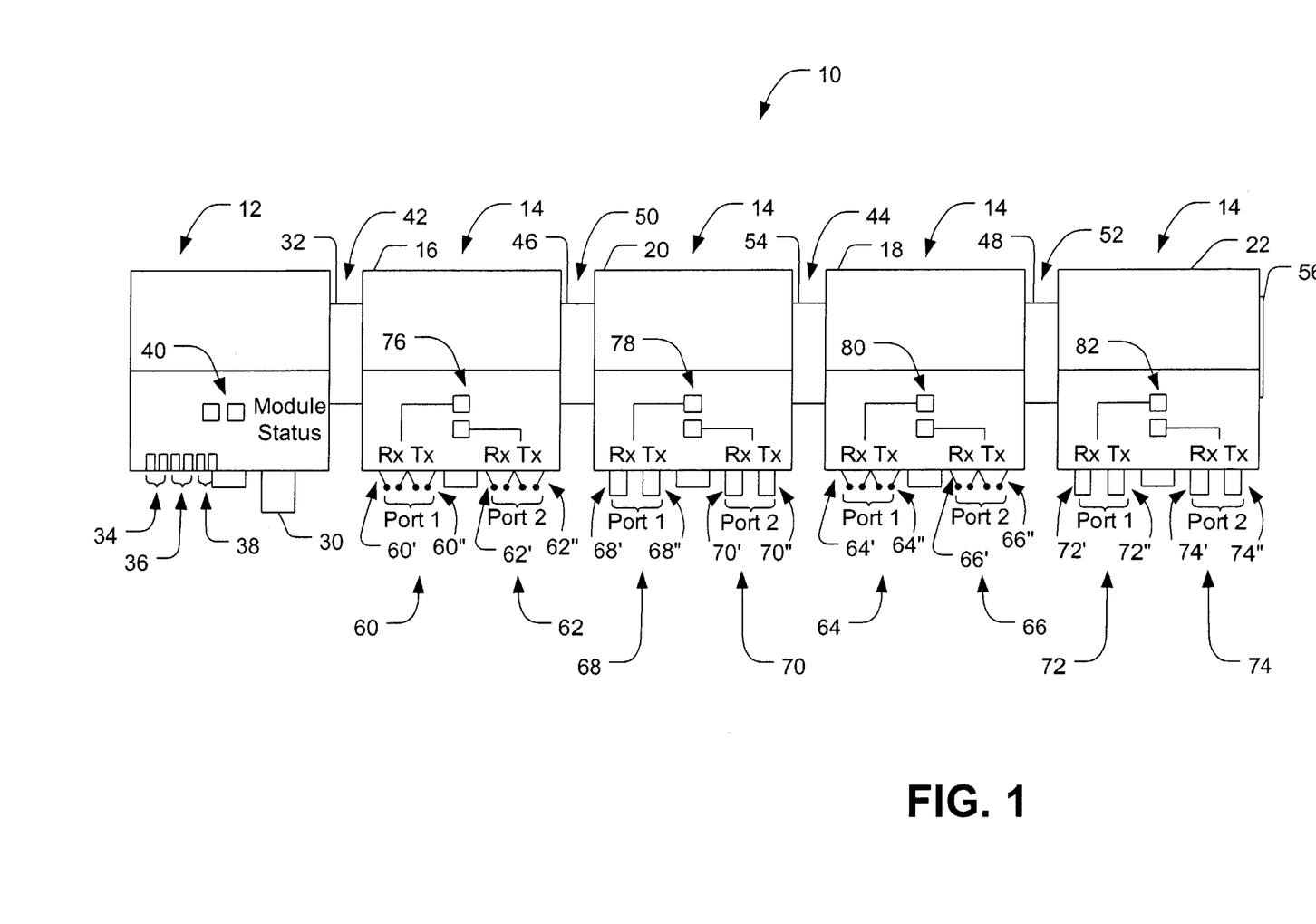
FIG. 1 is an illustration of a modular repeater system formed in accordance with the present invention.
Figure 2A:
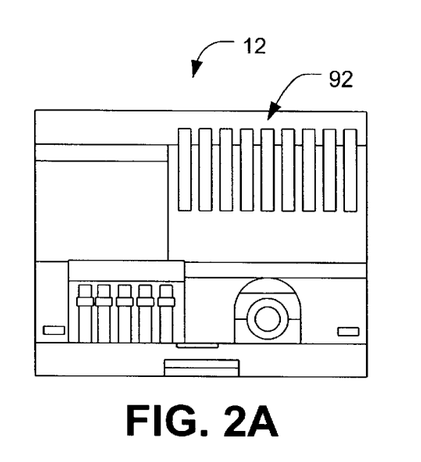
FIGS. 2a–2d are perspective views of a repeater adapter unit as shown in FIG. 1 and formed in accordance with present invention.
Figure 2B:
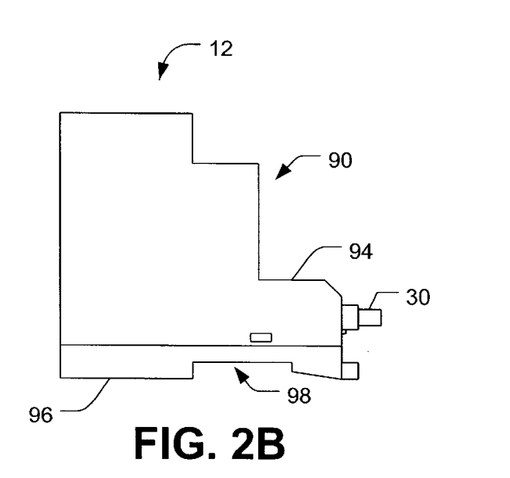
Figure 2C:
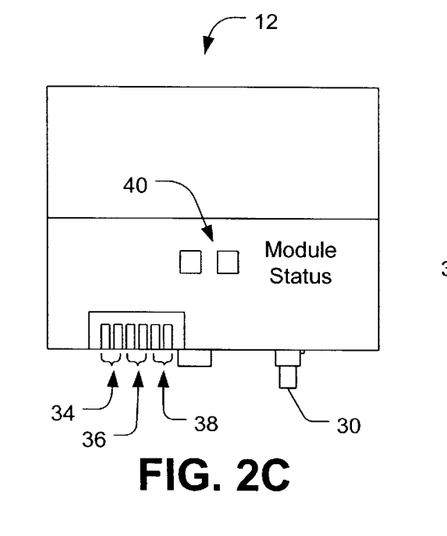
Figure 2D:
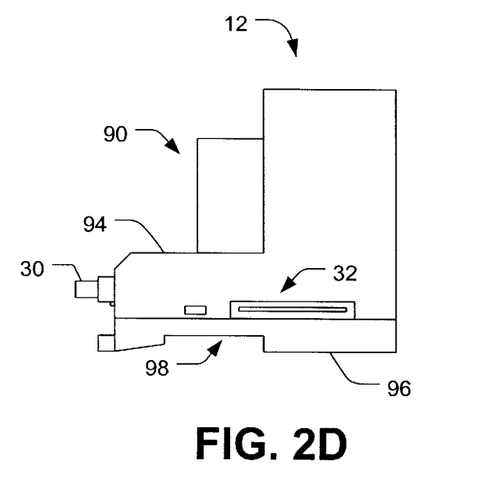

Turning now to the drawings wherein the showings are for the purposes of illustrating the preferred embodiment of the invention only and not for purposes of limiting same, FIG. 1 shows a modular repeater system 10 adapted for use in an industrial control application and formed in accordance with the present invention. The modular repeater system 10 includes a single repeater adapter unit 12 and a set of intermatable communication modules 14 connected together generally as shown and in a mechanical and electrical manner to be subsequently described in greater detail below.

In the preferred embodiment illustrated, the communication modules 14 include a pair of short distance fiber optic cable communication modules 16, 18 and a pair of medium distance fiber optic cable communication modules 20, 22. Fiber optic communication media is preferred in industrial control environments because it is substantially immune to noise and supports longer cable lengths over traditional copper wires and, therefore, enables greater distances between communication modules. It is to be appreciated, however, that the plurality of communication modules 14 are easily adaptable to incorporate any form of communication media or technology including, for example, various non-fiber communication means such as infra-red (IR) and radio-frequency (RF) communication schemes.

Those skilled in the art will understand that the communication modules 14 comprising the instant invention are readily convertible for use with the various forms of communication medias and technologies mentioned above and a wide variety of others, through mere selection of the appropriate physical communication layer hardware to establish the interface with the selected media type. In order to most easily facilitate an understanding of the preferred embodiment of the present invention, however, the discussions to follow below will focus only on short and medium distance fiber-optic media types currently preferred in industrial applications.

In the topology shown in FIG. 1, the modular fiber repeater system 10 advantageously exploits the functionality of a single repeater adapter unit 12 to interface the plurality of communication modules 14 with an operatively associated industrial control system or communication network (not shown). In that regard, the repeater adapter unit 12 is provided with a first communication connector 30, preferably a standard BNC type co-axial cable connector, for connecting the repeater adapter unit with the operatively associate industrial control system or communication network. Of course, other connector configurations are to be used when the repeater adapter unit 12 is to be connected to the industrial control system using a fiber optic or other type of interface media. A female connector 32, preferably a printed circuit board mounted connector, is provided on one side as shown for connecting the repeater adapter unit 12 with any one of the plurality of intermatable communication modules 14. In addition to the connectors described above, the repeater adapter unit 12 includes a power supply terminal 34 for connecting the repeater adapter to a source of DC power, such as a 24 volt DC supply, a ground terminal 36 for connecting the repeater adapter to a ground potential, an auxiliary terminal 38 for future expansion of the system to meet application requirements or the like, and a set of status indicia 40, preferably light emitting diodes (LEDs), the function of which will be subsequently described.

With continued reference to FIG. 1, it is an advantage of the present invention that each of the communication modules 14 are equally adapted, physically and electronically, to connect with the printed circuit board mounted connector 32 of the repeater adapter unit 12. In that regard, the particular number of short 16, 18 and medium 20, 22 distance cable communication modules and their particular stacked arrangement as shown is for purpose of illustration only and not meant to imply in any way that the modules must be connected to the repeater adapter in any particular order or number. The communication modules are interchangeable.

In the preferred embodiment illustrated, each of the short distance fiber optic cable communication modules 16, 18 are substantially rectangular in overall shape as shown and are provided on a first side with a printed circuit board mounted male connector 42, 44 and on a second opposing side with a printed circuit board mounted female connector 46, 48, respectively. Similarly, each of the medium distance fiber optic cable communication modules 20, 22 are provided on a first side with printed circuit board mounted male connectors 50, 52 and on a second opposing side with printed circuit board mounted female connectors 54, 56. The number and arrangement of electrical contacts on the male printed circuit edge connectors 42, 44, 50, 52 are selected to correspond to the number and arrangement of electrical contacts in the printed circuit board mounted female connector 32 on the repeater adapter unit 12 shown best in FIG. 3.

Each of the male plug connectors 42, 44, 50, 52 are physically and electrically intermatable with the socket connector 32 on the repeater adapter 12. In addition, the number and arrangement of electrical contacts in the printed circuit board mounted female socket connectors 46, 48, 54, 56 are selected to correspond to the number and arrangement of electrical contacts in each of the printed circuit board mounted male connectors 42, 44, 50, 52. In that way, each of the male plug connectors 42, 44, 50, 52 are physically and electrically intermatable with each of the female socket connectors 46, 68, 54, 56.

Thus, it is an advantage of the present invention that the modular repeater system 10 is flexible with regard to the quantity, up to four modules in the preferred embodiment illustrated, and stacking arrangement of the communication modules 14 therein. Those skilled in the art will readily understand that more than four modules can be accommodated by merely widening the cascading backplane and increasing the pin count in the module connectors.

With yet continued reference to FIG. 1, each of the short distance fiber optic cable communication modules 16, 18 includes a pair of bi-directional communication connectors 60, 62 and 64, 66, respectively. The connectors 60–66 are adapted to support simplex plastic or glass fiber communication cables. Duplex plastic or glass communication cables are supported when appropriate internal transceiver connections are made within the module. Similarly, each of the medium distance fiber optic cable communication modules 20, 22 respectively includes a pair of bi-directional fiber optic communication connectors 68, 70 and 72, 74.

According to the preferred embodiment illustrated, each of the communication connectors 60–74 includes separate receive and transmit terminals shown in the FIGURE using prime (') and double prime (") notation, respectively. As an example, the bi-directional communication connector 60 of the first short distance fiber optic cable communication module 16 includes a discrete receive terminal 60' and a discrete transmit terminal 60". The details of the internal circuitry of the communication modules 14 will be subsequently described.

Lastly, in connection with the broad illustration of the modular repeater system 10 shown in FIG. 1, each of the communication modules 16–22 includes communication status indicia 76, 78, 80 and 82. Preferably, the status indicia are a pair of LEDs connected to suitable electronic circuitry disposed within the communication modules for presenting an external visual indication of the status of the respective communication port circuits within each of the modules. As an example, acording the preferred embodiment, a one or both of the communication status indicia LEDs 76 on the first communication module 16 illuminate when a respective one or both of the communication ports within the module is actively receiving or transmitting communication information. Other uses of the status indicia are also possible as would occur to those skilled in the art.

Turning now to FIGS. 2a–2d, the preferred overall shape and construction of the modular repeater adapter unit 12 will be described. The repeater adapter is preferably formed of a resilient heat-resistant plastic material and, as shown, is generally rectangular in shape including a vertical from face 90 provided with vent openings 92 for permitting the escape of heat generated by electronic components located within the repeater adapter. A horizontal substantially planar top surface 94 of the repeater adapter provides a suitable location for the set of status indicia 40 to be observable by technical or maintenance personnel. In normal operation, the modular communication system 10 is disposed within an enclosure, industrial cabinet, or the like, in the orientation shown in FIG. 2c. Accordingly, the status LEDs 40 are directly visible.

To facilitate the mounting of the modular repeater system 10 in a manner described above, the bottom surface 96 of the repeater adapter 12 is adapted in a connection area 98 for mounting onto a standard 35 mm wide DIN rail. Suitable latching mechanisms (not shown) well known in the art are used to latch the repeater adapter 12 to the DIN rail. One or more DIN rail anchors may be used to ensure that the repeater adapter unit 12 does not slide along the DIN rail and to provide a positive locking engagement between the repeater adapter 12 and the plurality of intermated communication modules 14 when arranged as shown in FIG. 1.

Figure 3:
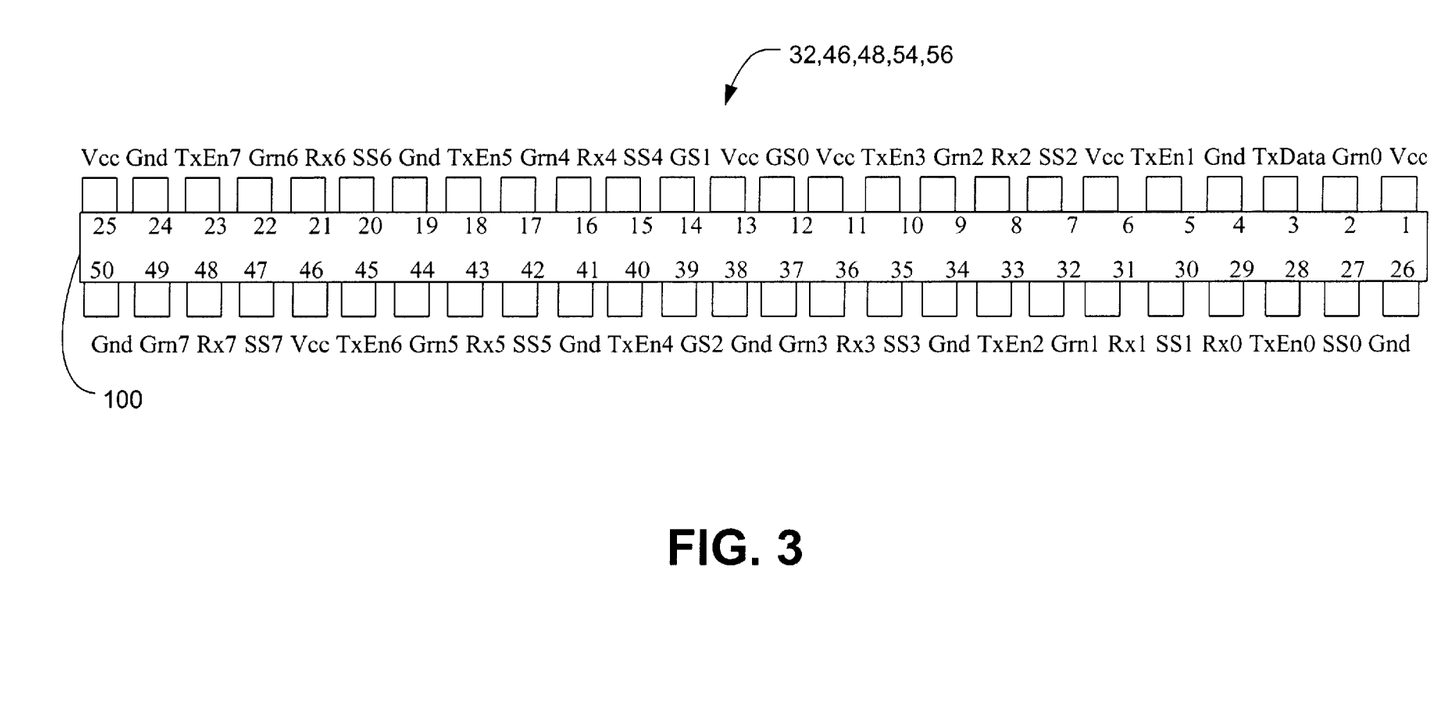
FIG. 3 is a representation of a socket connector formed on the repeater adapter unit shown in FIGS. 2a–2d.

The relative location and general arrangement of electrical contacts 100 within the socket connector 32 of the repeater adapter unit 12 is shown in FIG. 3. As illustrated there, the preferred socket connector 32 includes a set of fifty (50) power and communication signal pins arranged within a standard fifty pin printed circuit board mounted connector, preferably of the type manufactured by Amp under the part numbers 557101-9 and 559100-9, although other equivalent connectors may be used. In the preferred embodiment, the repeater adapter 12 and each of the communication modules 14 are provided on one side with printed circuit board mounted female connectors 46, 48, 54, 56 having the pin arrangement and construction substantially as shown in FIG. 3. Male connectors 42, 44, 50, 52 having a corresponding pin arrangement are provided on the set of communication modules 14 on a side opposite the female connectors 46, 48, 54, 56 so that the modules are stackable and interchangeable. Each communication repeater system 10, however, is ensured to have only a single repeater adapter unit 12 by providing only a female type connector 32 thereon. No male connectors of the type intermatable with the female connectors 46, 48, 54, 56 are provided on the repeater adapter. The plurality of communication modules 14 are thereby adapted to connect to only one side of the repeater adapter unit 12 for reasons which will subsequently become apparent. Multiple repeater adapter units are not interconnectable.

Table I below identifies and describes the function of each electrical contact pin comprising the electrical contact arrangement 100 of FIG. 3.

TABLE I

| Pin Identification | Pin Description |
| --- | --- |
| Vcc | System power, 5 Vdc +/−5%, 1.6 amps, qty = 6 |
| Gnd | System ground, qty = 8 |
| TxData | Transmit data for each fiber channel, qty = 1 |
| SSpareX | A swizzled spare for each channel, reserved for future use, qty = 8 |
| GSpareX | A global spare (non-swizzled) reserved for future use, qty = 3 |
| RxDataX | Data received from each fiber channel, qty = 8 |
| TxEnX | Transmit enable for each fiber channel, qty = 8 |
| GrnX | Control signal for each fiber channel green LED, qty = 8 |

Figure 4:
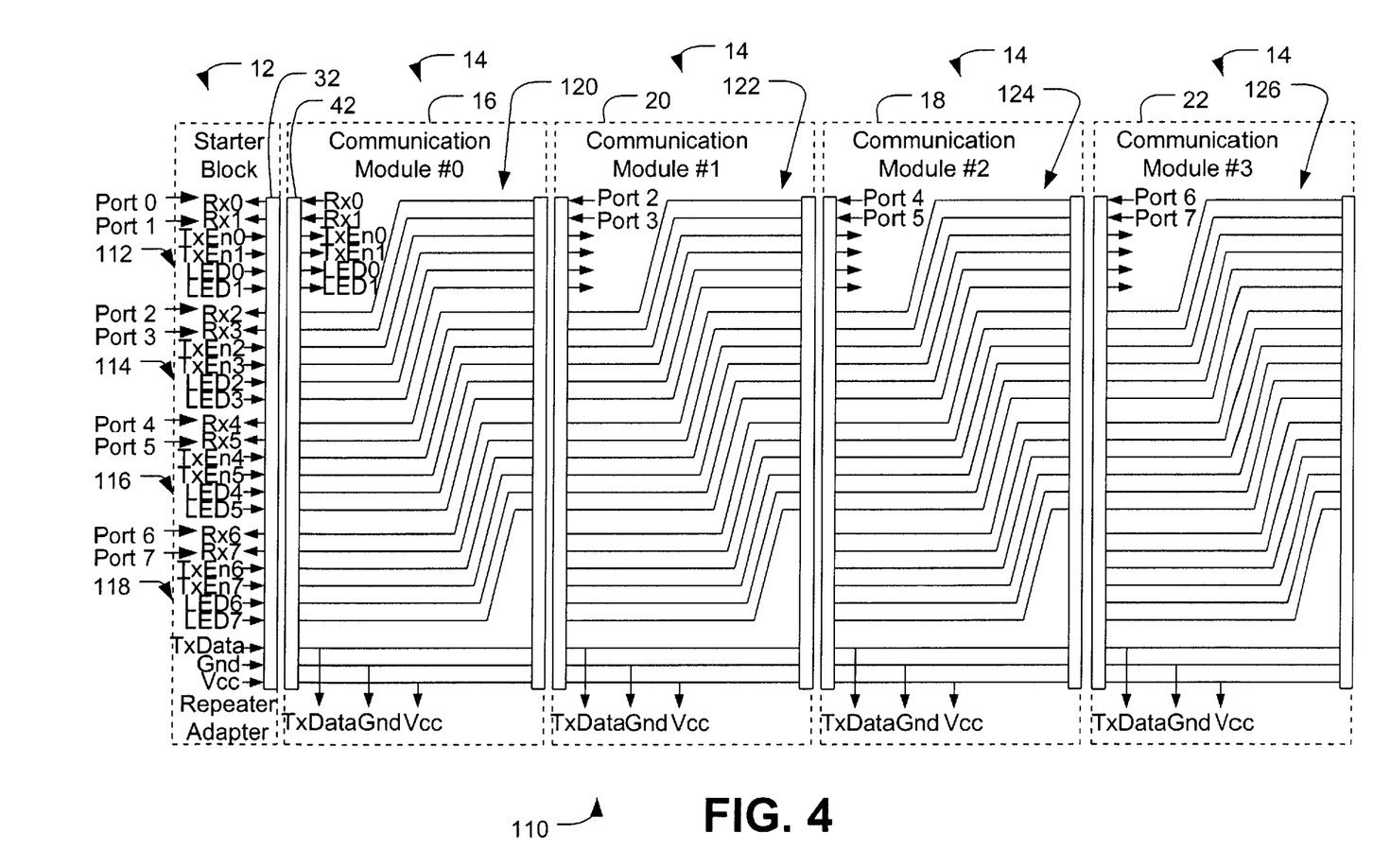
FIG. 4 is an illustration of the preferred cascaded backplane formed by the set of communication modules arranged in the modular repeater system shown in FIG. 1.
Figures 5A, 5B:
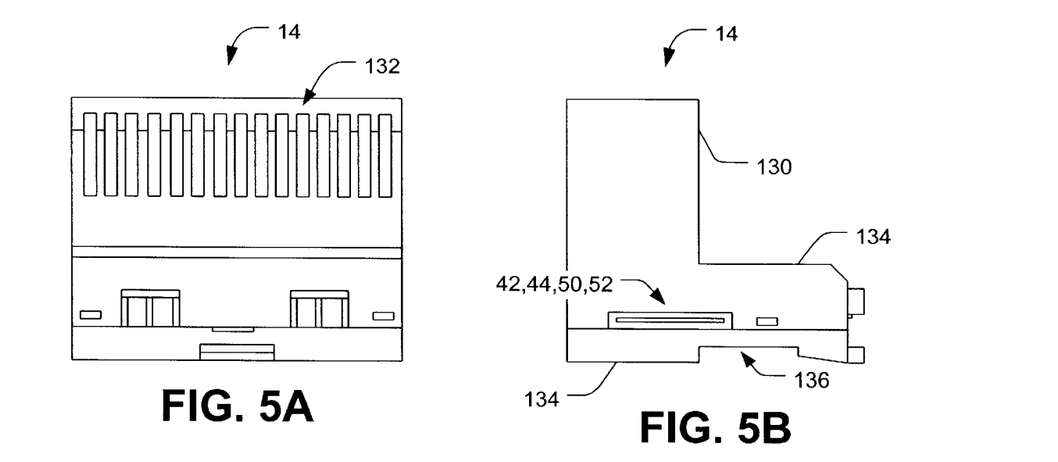
FIGS. 5a–5d are perspective views of a representative communication module shown in FIG. 1 and formed in accordance with the present invention.
Figures 5C, 5D:
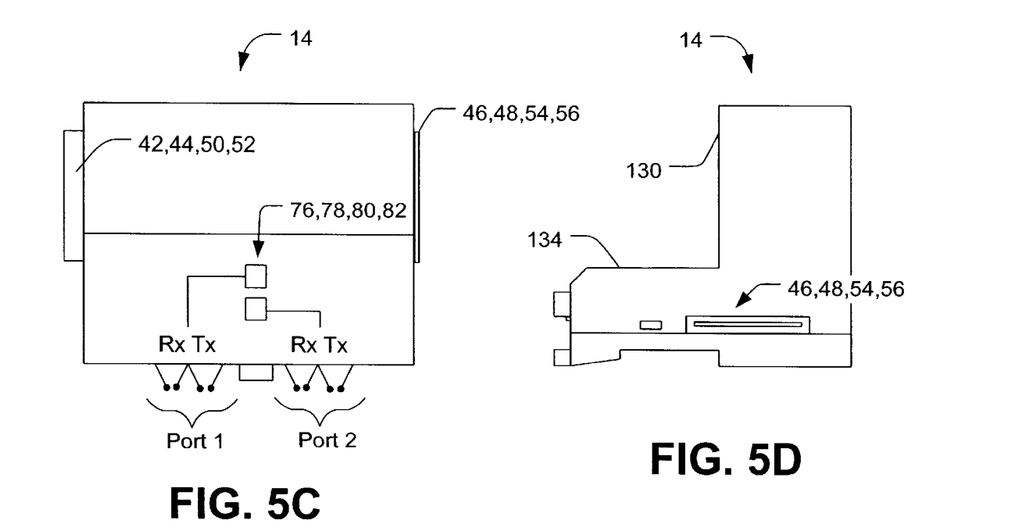

FIG. 4 illustrates the cascaded backplane 110 effectively created when each of the communication modules 14 are connected together with a single repeater adapter unit 12. It is an advantage of the present invention that communication and power signals are supplied between the repeater adapter 12 and the communication modules 14 via the backplane generally as depicted schematically in the FIGURE. In addition, the backplane is configured as shown so that communication module identification schemes or other equivalent communication routing techniques used in the prior art are not needed to perform the communication repeater function of the subject invention whereby communication information from one port is broadcast onto all other ports in the network.

According to the preferred embodiment, the repeater adapter is adapted to accommodate up to four sets 112, 114, 116, 118 of communication port pairs for a total of eight (8) communication ports Port0–Port7. Each of the communication modules 14 are correspondingly adapted to accommodate two communication ports. As illustrated in FIG. 4, the first communication module 16 includes a rippled first backplane segment 120 connected to the socket 32 of the repeater adapter 12 through the intermatable plug connector 42. Each of the other communication modules 18, 20, 22 include identically formed rippled or "swizzled" backplane segments 122, 124, 126 adapted to evenly distribute the four sets 112, 114, 116, 118 of communication port pairs over the set of four communication modules in a cascaded manner as shown.

With continued reference to FIG. 4, the first set 112 of communication port pairs Port0–Port7 are connected directly to the first communication module 16 as shown. The second set 114 of communication ports Port2–Port3 are routed to the second communication module 20 due to the rippled first backplane segment 120 of the first communication module 16. In a similar fashion, the third set 116 of communication ports Port4–Port5 are routed to the third communication module 18 through the rippled first and second backplane segments 120, 122 of the first and second communication modules 16, 20. Lastly, the fourth set 118 of communication ports Port6–Port7 are routed to the fourth communication module 22 through the rippled backplane segments 120, 122, 124 of the first through third 16, 20, 18 communication modules.

Using the rippled or swizzled backplane segments in a manner described above, the repeater adapter unit 12 is able to determine the origin of communication signals received on the socket connector 32. In that regard, any signals received on the first set 112 of communication ports Port0–Port1 necessarily originated from the first communication module 16 stacked adjacent to the repeater adapter unit. Correspondingly, signals received on the second, third, and fourth sets 114, 116, 118 of communication ports Port2–Port3, Port4–Port5, and Port6–Port7 necessarily originated from the second, third, and fourth communication modules, respectively, stacked in succession onto the first communication module and repeater adapter.

Turning next to FIGS. 5a–5d, the preferred overall shape and construction of the set of communication modules 14 will be described. Preferably, the modules are formed of a resilient heat-resistant plastic material and are generally rectangular in shape including a vertical front face 130 provided with vent openings 132 for permitting the escape of heat generated by electronic components located within the communication modules. A horizontal substantially planar top surface 134 of the communication modules 14 provides a suitable location for the set of status indicia 76–82 to be observable by technical or maintenance personnel.

To facilitate the mounting of the communication modules 14 onto a standard 35 mm wide DIN rail, the bottom surface 134 of the communication modules are formed in a manner to include a connection area 136 substantially conforming in shape, size, and location relative to the connectors 42, 46 with the hub repeater adapter.

Figure 6:
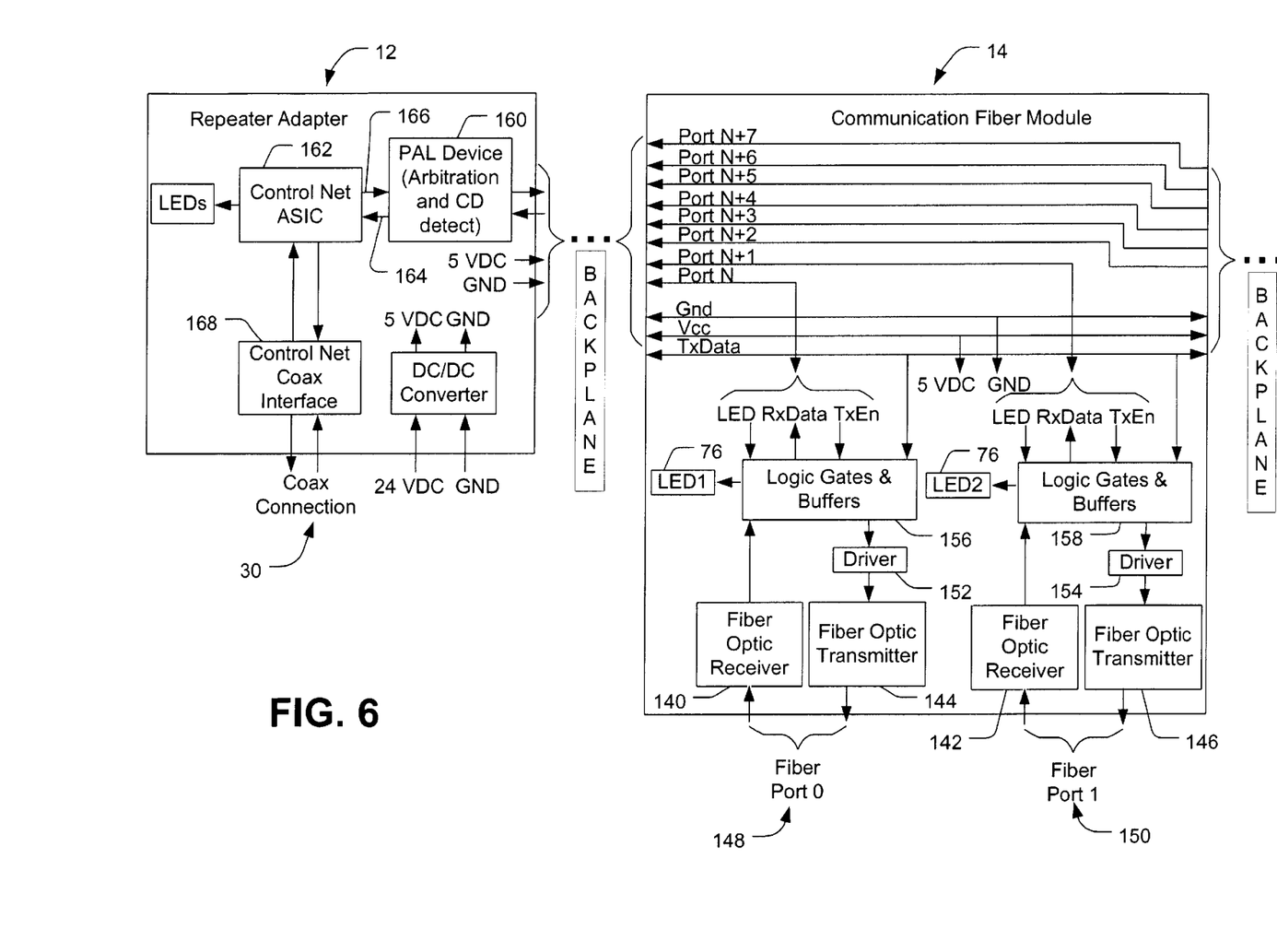
FIG. 6 is a block diagram illustration of the electronic circuits included within the communication modules and the repeater adapter unit shown in FIG. 1.

FIG. 6 illustrates in block diagram form the electronic circuitry within the repeater adapter unit 12 together with an exemplary communication module 14 formed in accordance with the preferred embodiment of the present invention. The communication module 14 includes a first and second fiber optic receiver circuit 140, 142 as illustrated. In addition, first and second fiber optic transmitter circuits 144, 146 are provided as shown in a complimentary fashion to each of the first and second fiber optic receiver circuits. The first fiber optic receiver and transmitter circuits 140, 144 service a first fiber optic port 148 on the fiber communication module 14. In a similar fashion, the second fiber optic receiver and transmitter circuits 142, 146 provide a physical layer interface to a second fiber optic port 150 of the fiber communication module 14. A pair of driver circuits 152, 154 interface the first and second fiber optic transmitter circuits 144, 146 to corresponding logic gate and buffer circuits 156, 158. Each of the logic gate and buffer circuits are connected to a communication status indicia 76, preferably LEDs.

Although the first and second communication ports 148, 150 of the preferred embodiment of the present invention are adapted to send and receive communication data on fiber optic media, other media types can also be accommodated without departing from the scope of the invention. In that regard, those skilled in the art will recognize that the first and second communication ports 148, 150 are easily adaptable to operate with any type of media including all copper based media such as twisted pair and co-axial cables, all types of fiber based media such as glass and plastic cables, and all electromagnetic and optic media such as radio frequency and infra-red signal technologies.

As illustrated in FIG. 6, each of the first and second fiber optic ports 148, 150 are separately disposed on the fiber communication module 14 and separately connected to the repeater adapter unit 12 in a manner as shown. In that way, communication signals received on the first fiber optic port 148 are communicated to the repeater adapter unit 12 on the first signal line Port N. Similarly, communication signals received on the second fiber optic port 150 are communicated to the repeater adapter unit 12 on the second signal line Port N+1. Additional fiber communication modules stacked onto the module illustrated in the FIGURE communicate signals to the repeater adapter unit 12 through the remainder of the communication ports Port N+2–Port N+7 in a manner described above in connection with the cascaded backplane.

Operationally, any communication signal which is received into the first fiber optic receiver circuit 140 is communicated first to the repeater adapter unit 12 and then repeated onto all other fiber optic ports except for the port at which the signal originated. In this example, the signal received on the first port Port N (fiber Port0 148) is repeated onto each of ports Port N+1–Port N+7 (fiber ports Port1–Port7).

To accomplish the repeater function, the repeater adapter unit 12 includes a programmable array logic (PAL) device 160 formed to detect carrier signals on the communication signal lines and arbitrate those signals for conflict. An application specific integrated circuit (ASIC) 162 is programmed to receive the communication signals and information from the PAL device 160 on an input signal line 164 and repeat the signal and information onto an output signal line 166 for rebroadcast to all of the fiber optic ports within the modular repeater system 10 except, of course, for the port from which the signal originated. In addition to the above, the ASIC device 162 is further adapted to receive signals from the BNC connector 30 disposed on the repeater adapter unit 12 through a co-axial physical layer interface 168. In a manner described above, the ASIC device 162 receives the communication signals from the BNC connector 30 and rebroadcasts the communication signals onto each of communication ports Port N–Port N+7, in the preferred embodiment Port0–Port7, to each of the communication modules 14 within the modular fiber repeater system 10. Preferably, the ASIC device 162 is programmed to communicate using the ControlNet communication protocol.

Figure 7:
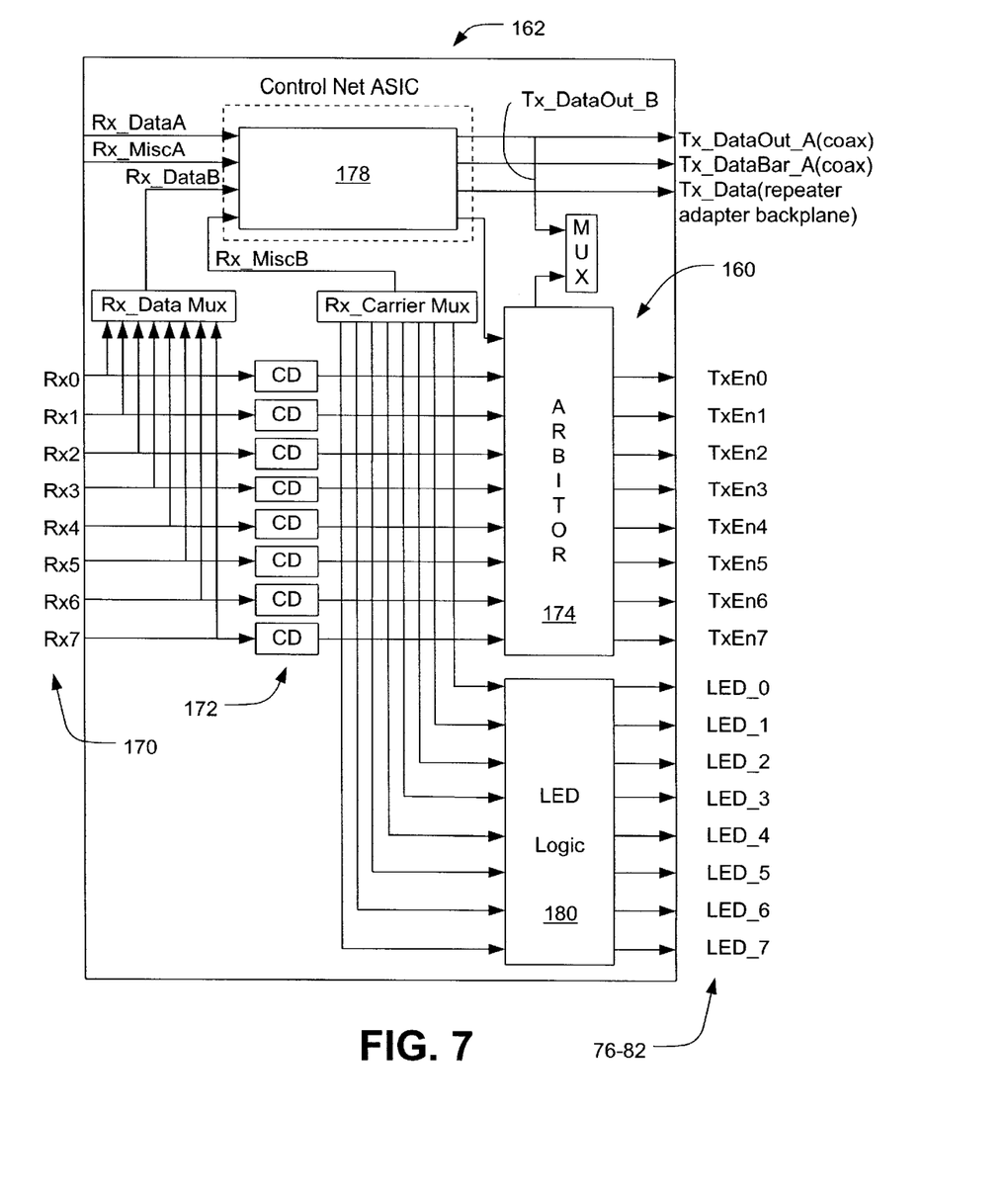
FIG. 7 is a block diagram illustration of a more detailed view of the electronic circuits formed in the repeater adapter unit of FIG. 1; and, FIG. 8 is an illustration of the subject modular repeater system used in a large industrial network application.

FIG. 7 illustrates a more detailed representation of the PAL and ASIC devices 160 and 162. With reference now to FIG. 7, the PAL device 160 is adapted to receive communication signals and information on a set of input lines 170. A set of carrier detect logic circuits 172 are connected to each of the communication signal inputs 170. The logic circuits are each adapted to generate a signal for use by other internal logic to indicate received data activity on the respective signal inputs 170. The LED Logic circuit 180 uses the carrier detect signals to illuminate the corresponding communication status indicia 76, 78, 80, 82 on the set of communication modules 14 within the modular repeater system 10. The carrier detect signals along with the TxEnable_B signal from the ControlNet ASIC 178 are also used by the arbiter 160 to determine which of the received communication signals are to be repeated.

The received communication signal can originate from the modular repeater backplane Rx0, Rx1, Rx2, Rx3, Rx4, Rx5, Rx6 and Rx6 or from the repeater adapter receive communication input Rx_DataA.

As described generally above, the ControlNet ASIC 178 is configured for repeater operation. When a ControlNet ASIC is configured for repeater operation according to the invention, any communication signal that is received at the Rx_DataA input is repeated to the Tx_DataOut_B output. Also, any signal that is received at the RxData_B input is repeated to the Tx_DataOut_A output. When a communication signal is repeated through the ControlNet ASIC in this manner, data jitter is removed.

With the modular repeater implementation, the Rx_DataA input of the ControlNet ASIC acts as the received communication input of the repeater adapter. The RxData_B input of the ControlNet ASIC for the modular repeater implementation is the selected communication data signal from the multiplexer Rx_Data Mux. The TxDataOut_A and TxDataOut_B output of the ControlNet ASIC 162 are routed back to the PAL 160 where the communication signal is selected for the backplane signal Tx_Data.

Rx_MiscA is a carrier detect input signal for the repeater adapter communication signal. The TxEnable_B signal from the ControlNet ASIC 162 is used by the arbiter 174 as a carrier detect signal of the TxDataOut_B signal. The Arbiter monitors the eight carrier detect signals from the data communication inputs 170 and the TxEnable_B signal from the ControlNet ASIC to determine which communication input has data activity. Once data activity is detected from a communication input, the arbiter 174 grants that communication channel or port ownership to that communication input.

Ownership remains controlled by that communication input until data activity is no longer detected. While ownership is granted, all other communication inputs are ignored.

When ownership is granted to one of the communication inputs from the system backplane, the arbiter activates all transmit enable signals except for the transmit enable for the port in which it is receiving from. When the ownership is granted to the communication input from the repeater adapter, all backplane transmit enable signals are activated.

Figure 8:
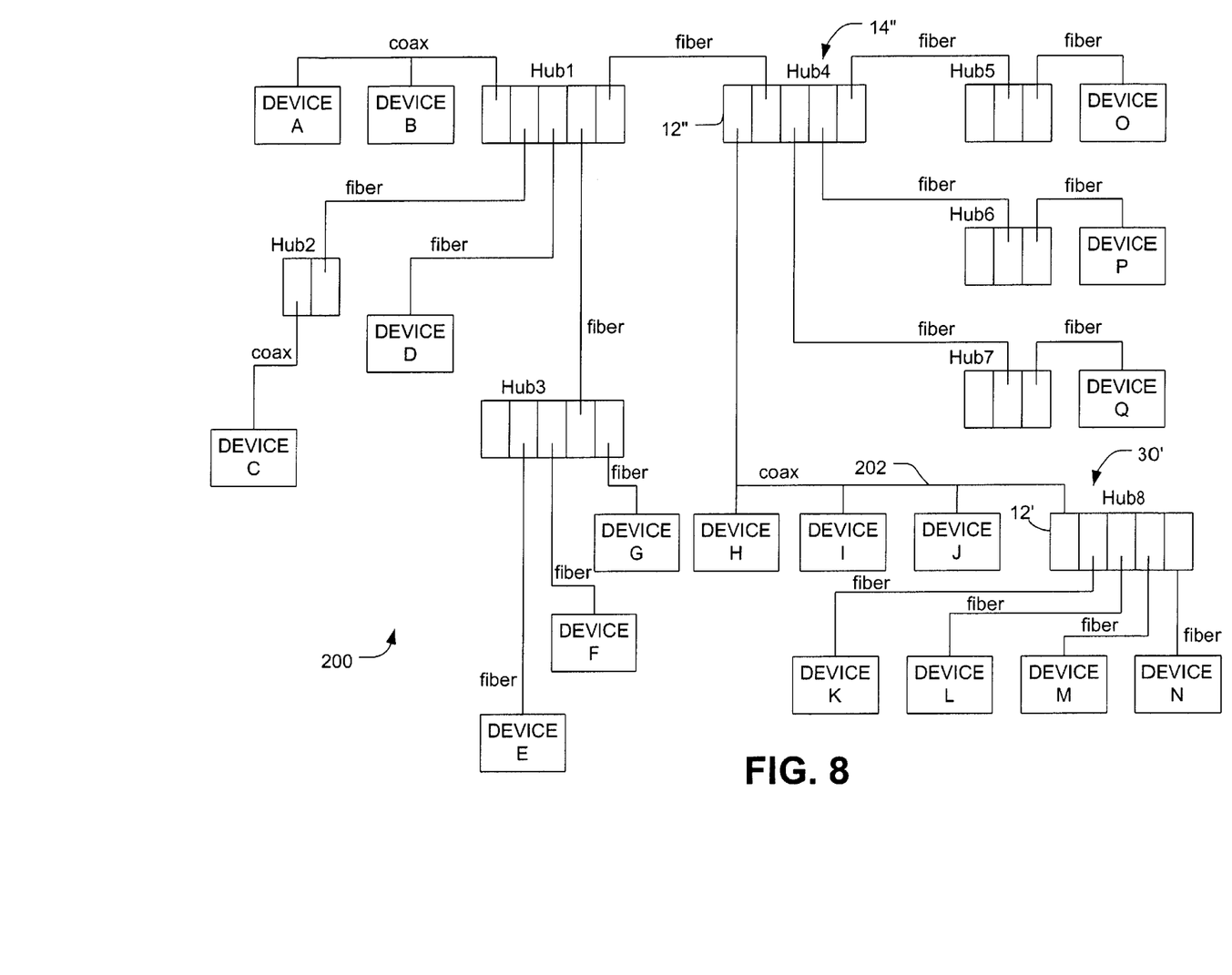

Turning lastly now to FIG. 8, a large industrial modular repeater network 200 is illustrated to demonstrate the flexibility and adaptability of the present invention in a wide range of configurations. In that regard, a plurality of modular repeater systems HUB1–HUB8 of the type illustrated in FIG. 1 but having a set of four or less communication modules connected thereto are shown connected to a plurality of discrete communication or industrial control devices Device A–Device Q.

Each of the plurality of modular repeater systems HUB1–HUB8 operate in a manner described above in connection with the preferred modular repeater system 10 of the present invention. As an example, a signal originating on Device N is received first onto the backplane of the modular repeater system HUB8 and, in turn, forwarded to the repeater adapter unit 12' of HUB8. The repeater adapter unit 12', in turn, forwards the message to Devices K, L, and M connected to the repeater system HUB8 and, in addition, onto the coax cable 202 to the BNC connector 30' connected to the repeater adapter unit 12'. The coax cable 202 is connected directly to Devices H, I, and J as illustrated. In addition, the coax cable 202 is connected to the repeater adapter unit 12" of a second modular repeater system HUB4. The second repeater adapter unit 12" of HUB4 receives the data and rebroadcasts same onto each of the communication modules 14" connected thereto. In that way, the modular repeater system HUB4 rebroadcasts the signal from Device N onto each of HUB1–HUB7. HUB 1, in turn, rebroadcasts this signal to HUB2 and HUB3. Accordingly, a single communication signal originating from Device N will be replicated throughout the entire modular fiber hub network 200 shown in the FIGURE.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A communication repeater system for use in an industrial control system to repeat communication activity detected on one communication port onto multiple communication ports in the industrial control system, the communication repeater system comprising:

a communication repeater adapter device including:

a repeater adapter connector having a first set of repeater adapter contacts at a first position on the repeater adapter connector and a second set of repeater adapter contacts at a second position on the repeater adapter connector: and         a communication repeater circuit adapted to receive communication data on a one of said first set of repeater adapter contacts and said second set of repeater adapter contacts and broadcast said communication data onto the other one of said first set of repeater adapter contacts and said second set of repeater adapter contacts;

a first repeater communication module including:

a first communication circuit for transmitting and receiving said communication data on a first communication port in said industrial control system;

a first input connector intermatable with said repeater adapter connector, the first input connector having i) a first set of electrical contacts connected to said first set of repeater adapter contacts, and ii) a second set of electrical contacts connected to said second set of repeater adapter contacts;

a first output connector substantially identical in construction to said repeater adapter connector, the first output connector having i) a first set of electrical contacts arranged on the first output connector at a first position substantially corresponding to said first position of said first set of repeater adapter contacts on the repeater adapter connector, and ii) a second set of electrical contacts arranged on the first output connector at a second position substantially corresponding to said second position of said second set of repeater adapter contacts on the repeater adapter connector; and a first backplane interconnecting i) said first set of electrical contacts in said first input connector to said first communication circuit, and ii) said second set of electrical contacts in said first input connector to said first set of electrical contacts in said first output connector.

2. The communication repeater system according to claim 1 wherein the first communication circuit of the first repeater communication module is adapted to interface the first repeater communication module with a one of a fiber based communication media, a copper based communication media, and a broadcast based communication media.

3. The communication repeater system according to claim 1 further comprising:

a second repeater communication module including:
  a second communication circuit for transmitting and receiving communication data on a second communication port in said industrial control system;
  a second input connector intermatable with said first output connector of the first repeater communication module, the second input connector having a first set of electrical contacts connected to said first set of electrical contacts in said first output connector of the first repeater communication module; and,
  a backplane interconnecting said first set of electrical contacts in said second input connector to said second communication circuit.

4. The communication repeater system according to claim 3 wherein the first communication circuit of the first repeater communication module is adapted to interface the first repeater communication module with a one of a fiber based communication media, a copper based communication media, and a broadcast based communication media.

5. The communication repeater system according to claim 4 wherein the second communication circuit of the second repeater communication module is adapted to interface the second repeater communication module with a one of a fiber based communication media, a copper based communication media, and a broadcast based communication media.

6. The communication repeater system according to claim 5 wherein said first repeater communication module is adapted to receive said communication data on said second communication port from said second repeater communication module and transmit said communication data to said communication repeater adapter device through said first backplane.

7. The communication repeater system according to claim 6 wherein said first repeater communication module is adapted to receive said communication data on said second communication port from said communication repeater adapter device and transmit said communication data on said first communication port through said first communication circuit.

8. The communication repeater system according to claim 7 wherein the first repeater communication module is adapted to receive said communication data on said second communication port from said second repeater communication module through the first set of electrical contacts in said first output connector and transmit said communication data to said communication repeater adapter device through said first input connector.

9. A communication system comprising:

a communication repeater adapter including a plurality of communication receiver circuits, a plurality of communication transmit circuits, and a repeater circuit for receiving a communication signal on the plurality of communication receiver circuits and broadcasting the communication signal as a re-broadcast communication signal on the plurality of communication transmit circuits, the communication repeater adapter being adapted to receive the communication signal on a first one of the plurality of communication receiver circuits and broadcast the communication signal as said re-broadcast communication signal on the other communication transmit circuits not including the first one of the plurality of communication transmit circuits corresponding to said first one of the plurality of communication receiver circuits; and, a plurality of repeater communication modules connected to the communication repeater adapter, each of the plurality of repeater communication modules including a communication port and a communication circuit, the communication port and the communication circuit being adapted to:
  receive the communication signal into the repeater communication module and transmit the communication signal to a one of the plurality of receiver circuits of the communication repeater adapter; and,
  receive the re-broadcast communication signal from a one of the plurality of transmit circuits of the communication repeater adapter into the repeater communication module and deliver the re-broadcast communication signal onto the communication port.

10. The communication repeater system according to claim 9 wherein the plurality of repeater communication modules are adapted to interface the communication repeater system with a one of a fiber based communication media, a copper based communication media, and a broadcast based communication media.

11. The communication repeater system according to claim 10 wherein the plurality of repeater communication modules are adapted to interface the communication repeater system with each of a fiber based communication media, a copper based communication media, and a broadcast based communication media.

* * * * *